United States Patent
Shaffer

(10) Patent No.: US 8,915,035 B2
(45) Date of Patent: Dec. 23, 2014

(54) FLOOR TILE DESIGNED FOR MULTIPLE TILE IMAGES

(75) Inventor: John Shaffer, Scottsdale, AZ (US)

(73) Assignee: Ripfloor LLC, Park City, UT (US)

( * ) Notice: Subject to any disclaimer, the term of this patent is extended or adjusted under 35 U.S.C. 154(b) by 501 days.

(21) Appl. No.: 13/015,336

(22) Filed: Jan. 27, 2011

(65) Prior Publication Data

US 2011/0179734 A1    Jul. 28, 2011

Related U.S. Application Data

(60) Provisional application No. 61/299,002, filed on Jan. 28, 2010.

(51) Int. Cl.
| | |
|---|---|
| E04F 15/16 | (2006.01) |
| E04F 15/02 | (2006.01) |
| B44C 5/04 | (2006.01) |
| B32B 27/08 | (2006.01) |
| B44F 1/10 | (2006.01) |

(52) U.S. Cl.
CPC .............. *E04F 15/02* (2013.01); *B44C 5/0446* (2013.01); *B32B 27/08* (2013.01); *E04F 15/16* (2013.01); *E04F 2201/0138* (2013.01); *B44F 1/10* (2013.01)
USPC ........................................ 52/311.2; 52/316

(58) Field of Classification Search
USPC .................. 52/311.2, 314, 316, 591.1–591.5
See application file for complete search history.

(56) References Cited

U.S. PATENT DOCUMENTS

| | | | | | |
|---|---|---|---|---|---|
| 4,546,025 | A | * | 10/1985 | Vaisman | 52/311.2 |
| 5,613,332 | A | * | 3/1997 | Saylor, Jr. | 52/177 |
| 5,762,529 | A | * | 6/1998 | Nizza | 52/311.2 |
| 6,098,354 | A | * | 8/2000 | Skandis | 52/591.1 |
| 6,367,218 | B2 | * | 4/2002 | Lombardo | 52/311.2 |
| 6,802,164 | B1 | * | 10/2004 | Newbrough et al. | 52/311.1 |
| 7,257,928 | B2 | * | 8/2007 | Glockl | 52/311.1 |
| 7,365,908 | B2 | * | 4/2008 | Dolgoff | 359/463 |
| 8,640,413 | B2 | * | 2/2014 | Ruggie et al. | 52/311.2 |
| 2004/0172903 | A1 | * | 9/2004 | Fenzi | 52/311.1 |

* cited by examiner

*Primary Examiner* — Mark Wendell
*Assistant Examiner* — Matthew J Smith
(74) *Attorney, Agent, or Firm* — Robert A. Parsons; Michael W. Goltry; Parsons & Goltry

(57) ABSTRACT

A laminated floor tile includes the following layers laminated together into a single unit, a base having an underside, an upper surface, and perimetric edges, the base being formed of a high impact copolymer material designed to provide a slight flexure, the base including tabs designed to interact with adjacent floor tiles to hold the adjacent tiles fixedly in place, and panels extending upwardly from the perimetric edges of the base and forming the upper surface into a tray shape, graphic media positioned on the base within the tray, and a clear protective layer overlying the graphic image.

6 Claims, 4 Drawing Sheets

FLOOR TILE DESIGNED FOR MULTIPLE TILE IMAGES

FIELD OF THE INVENTION

This invention relates to floor tile, and more specifically floor tile that incorporate graphic designs and especially multiple tile patterns.

BACKGROUND OF THE INVENTION

Generally, floors specifically prepared for sports activities, such as basketball and the like, and/or corporate activities, are constructed of wood that is highly polished and extremely expensive initially and in subsequent upkeep and difficult to transport. Also wood is easily damaged and extremely costly to repair. This is equally true for floors in other venues which see high traffic.

It would be highly advantageous, therefore, to remedy the foregoing and other deficiencies inherent in the prior art.

Accordingly, it is an object the present invention to provide new and improved floor tiles that are especially useful in conveying a message or expanding an image by utilizing multiple tile images.

It is another object the present invention to provide new and improved floor tiles that are especially useful in the construction of high traffic facilities.

SUMMARY OF THE INVENTION

Briefly to achieve the desired objects of the present invention in accordance with a preferred embodiment thereof, provided is a laminated floor tile including the following layers laminated together into a single unit, a base having an underside, an upper surface, and perimetric edges, the base being formed of a high impact copolymer material designed to provide a slight flexure, the base including tabs designed to interact with adjacent floor tiles to hold the adjacent tiles fixedly in place, and panels extending upwardly from the perimetric edges of the base and forming the upper surface into a tray shape, graphic media positioned on the base within the tray, and a clear protective layer overlying the graphic image.

To further achieve the desired objects of the present invention in accordance with another embodiment thereof, a multiple floor tile image is produced that includes a plurality of floor tiles. Each tile includes a base having an underside, an upper surface, and perimetric edges, the base being formed of a high impact copolymer material designed to provide a slight flexure, the base including interlocking or tile connecting loops and tabs designed to interact with adjacent floor tiles to hold the adjacent tiles fixedly in place, the base further including panels extending upwardly from the perimetric edges thereof and forming the upper surface into a tray. Each tile includes a graphic media positioned in the tray and specifically designed to cooperate with adjacent floor tiles to form the multiple floor tile image and each tile of the plurality of tiles includes a protective coating overlying the graphic media.

To further achieve the desired objects of the present invention in accordance with a method thereof, a method of forming a multiple floor tile image is disclosed. The method includes providing a plurality of floor tiles, each tile including a base having an underside, an upper surface, and perimetric edges, the base being formed of a high impact copolymer material designed to provide a slight flexure, the base including interlocking or tile connecting loops and tabs designed to interact with adjacent floor tiles to hold the adjacent tiles fixedly in place, the base further including panels extending upwardly from the perimetric edges thereof and forming the upper surface into a tray. The method further includes the steps of providing a working image of the multiple floor tile image, separating the working image into multiple individual images corresponding to the multiple floor tiles and cropping parts of the individual images to make the original image stay in proportion and to scale, using the cropped individual images to form a specific graphic media for each specific tile of the multiple tiles, and positioning the specific graphic media in the tray of the specific tile, covering the graphic media of each tile of the plurality of tiles with a protective coating overlying the graphic media, and positioning the multiple tiles on a support and interlocking the multiple tiles by connecting the loops and tabs of adjacent tiles, the positioning including arranging the multiple tiles to form the multiple floor tile image.

BRIEF DESCRIPTION OF THE DRAWINGS

Specific objects and advantages of the invention will become readily apparent to those skilled in the art from the following detailed description of a preferred embodiment thereof, taken in conjunction with the drawings in which.

DETAILED DESCRIPTION OF A PREFERRED EMBODIMENT

Turning to the drawings in which like components are designated with like numbers, a floor tile 10 in accordance with the present invention is illustrated. In one application a floor tile 10 includes four laminate layers but it will be understood that fewer or additional layers could be included in other applications. Also, in this application floor tile 10 is illustrated as a 12" by 12" by 0.6" tile but it will be understood that these dimensions are simply for explanation of the invention and can be modified in accordance with specific applications. Further, in sports applications and corporate events, because wood floors are traditionally used in sports facilities and corporate event venues, tile 10 is provided with a wood style top surface so that converting a facility to the present tile causes a minimum amount of consternation. However, as will be described herein, a fifth layer can be added to provide a graphic design, logo, portion of a logo, or the like, on the tile, referred to as an image. Thus, sports logos, corporate logos, graphic images and the like can be provided in a single finished tile or supplied by using a combination of multiple tiles. It will of course be understood that any of a great variety of designs, textures and colors can be easily incorporated, which is one major advantage of floor tile 10.

Figure 1:
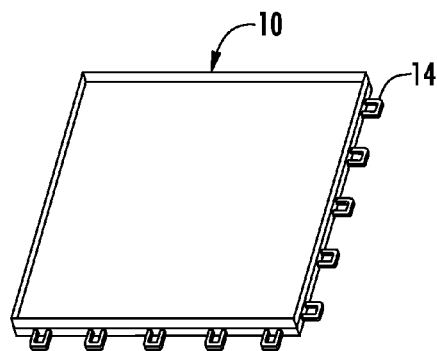
FIG. 1 is a top perspective view of one application of a floor tile in accordance with the present invention.
Figure 2:
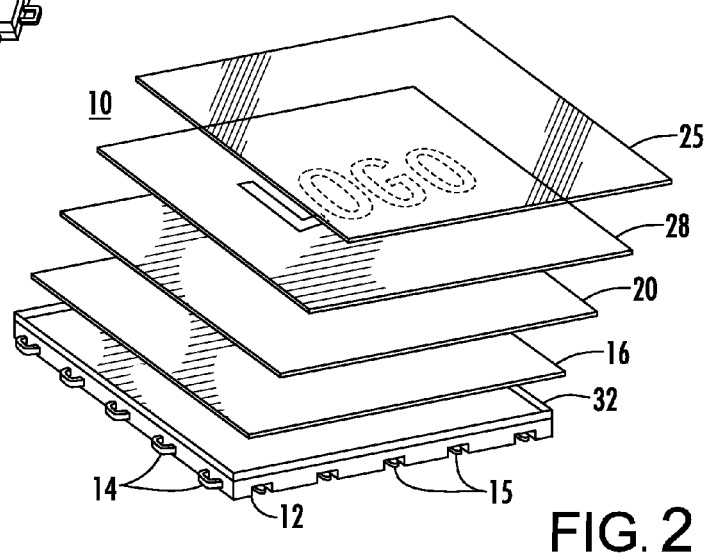
FIG. 2 is an exploded side view of the floor tile of FIG. 1.

As can be seen especially in FIG. 2, floor tile 10 includes a lower or bottom layer 12 that is referred to herein as a base 12. Base 12 is formed of a high impact copolymer material designed specifically to provide a slight flexure that substantially reduces shock to an athlete's, or other individual's legs and body. This slight flexure or flexibility of tile 10 greatly enhances the use of tile 10 as a floor in sports facilities, corporate event venues or other high traffic areas. Base 12 also includes a design and interlocking or tile connecting loops 14 and tabs 15 designed to interact with adjacent tiles to produce a completely cohesive floor.

A vinyl layer 16, hereinafter referred to as a "flexure and support layer", is provided on the upper surface of base 12 and provides additional flexure while further providing sufficient support for the entire laminate. While a vinyl material is used in this preferred embodiment it will be understood that other materials might be included in addition to or instead of vinyl layer 16.

A wear layer 20 is provided on vinyl layer 16. In this embodiment wear layer 20 includes a commercially available tile material. In this preferred embodiment wear layer 20 is approximately 0.40" thick. Wear layer 20 is the thickest layer in tile 10 and is specifically included adjacent the upper surface to receive most of the wear from long usage. It will be understood that wear layer 20 is formed of standard well known commercial material which withstands wear the same as any commercial tile presently available. Wear layer 20 typically includes the look of the tile, the color and texture such as wood, stone and the like.

A final protective layer 25 is applied over the upper surface of wear layer 20. It will of course be understood that since wear layer 20 can include the colors and/or designs, protective layer 25 can be substantially clear. In this preferred embodiment protective layer 25 includes aluminum oxide infused polyurethane. Also, preferably, protective layer 25 is a sound absorbing material layer approximately 0.100" thick that substantially reduces floor noises (e.g. foot falls, running noises, ball contact, etc.) common and sometimes annoying during sports activities or corporate events. Protective layer 25 can also form a textured surface that provides greater traction for athletes so that tile 10 greatly improves athletic usage of a floor. Protective layer 25 makes the entire floor easy to clean and maintain since common cleaning materials (sometimes not useable on wooden floors) are acceptable and do no damage to protective layer 25.

Figure 9:
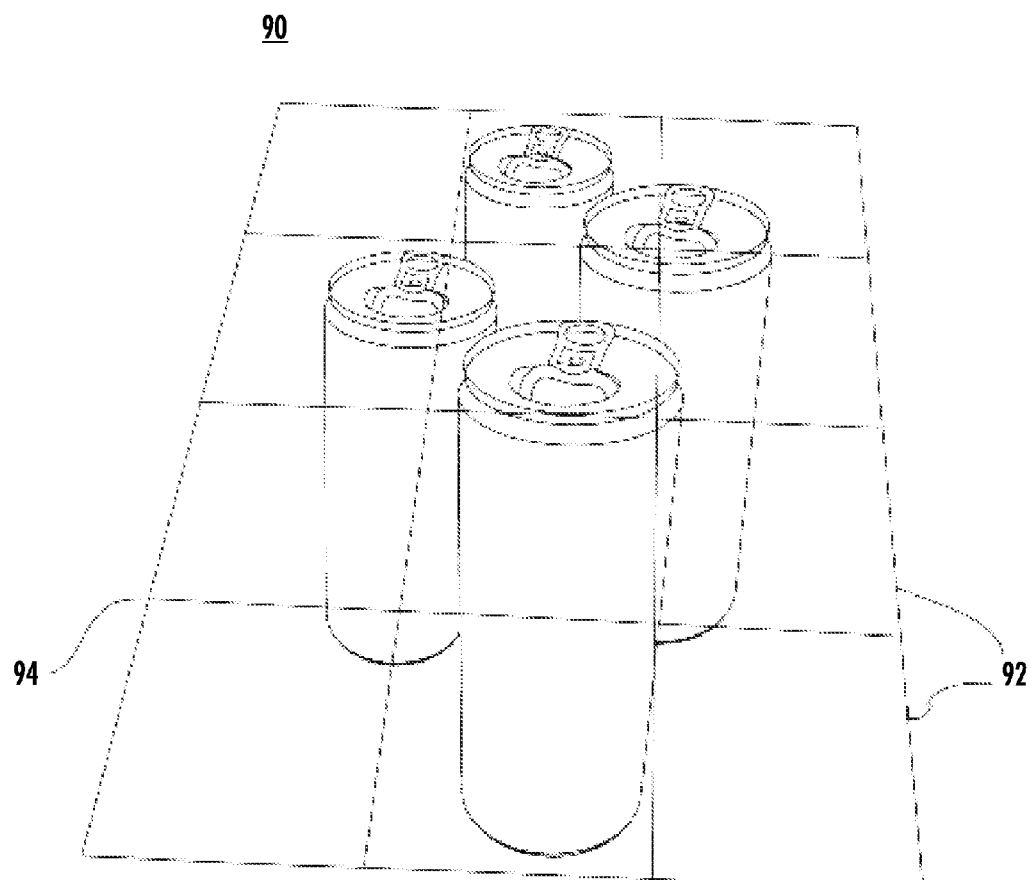
FIG. 9 is a perspective view illustrating multiple tiles forming an image.

Still referring to FIG. 2, a design layer 28 can be applied over the upper surface of wear layer 20 before the application of protective layer 25. Design layer 28 can include logos or other graphic designs applied over the overall look of the floor. For example, the tile can be made to look like a wood floor, with a sport, club, or school team logo formed thereon. For purposes of this disclosure, design layer 28 and wear layer 20 in combination are considered "graphic media". By having a logo or other graphic design formed in the finished tile, after installation application of logos is not required, reducing time and cost. Additionally, by providing the logo in the finished tile, the logo is protected by protective layer 25 and will not be exposed to wear. It will be understood that a graphic design, logo and the like, can be provided by different portions of the design carried by different tiles. When properly laid, the multiple tiles form the image, as shown in FIG. 9.

Figure 3:
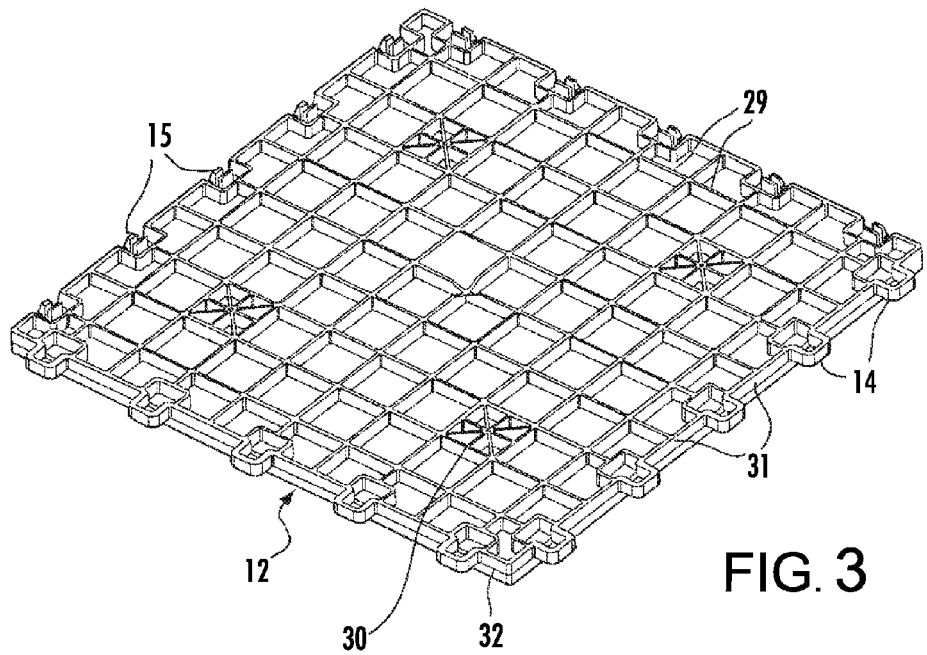
FIG. 3 is a bottom perspective view of the tile according to the present invention.

Turning now to FIG. 3, the underside of base 12 is illustrated. The underside of base 12 includes a cross hatched pattern of ribs 29 to provide support, with the addition of four star pattern rib structures 30 proximate each corner. Ribs 29 and star pattern ribs 30 provide support for rolling loads, such as bleachers, chair carts, tables and the like. Ribs 29 and star pattern structures 30 keep the tile base from flexing too radically, i.e. they tend to limit flexure of base 12 to the beneficial and favorable slight flexure described above.

Also, base 12 includes ribs or walls 31 extending around the outer edges and forming an integral portion of the cross hatched pattern of ribs 29. To further reduce or limit flexure, walls 31 extend slightly above the upper surface of base 12 to form upwardly extending side panels 32. Side panels 32 have a 1 degree draft that extends upwardly from the four sides of base 12. Side panels 32 form the upper surface of base 12 into a tray in which the laminate structure, or other tile components, can be received. Side panels 32 also provide additional rigidity to base 12. Further, side panels 32 simplify and provide some control in the assembly and installation of tiles 10.

Figure 4:
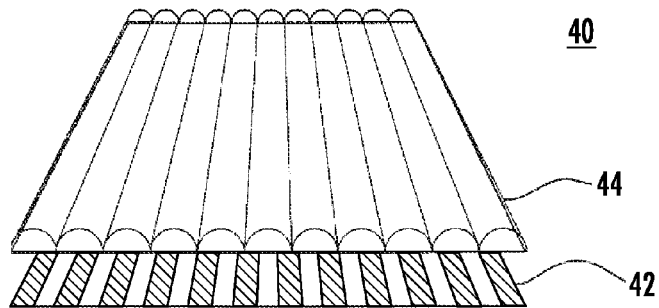
FIG. 4 is a perspective view illustrating an image including a lenticular lens.

In some applications an additional layer of lenticular 3D graphics can be included as a design layer. As is known in the art, lenticular 3D graphics is a process in which apparent dimension and/or apparent motion are added to a design. Lenticular graphics are made up of two components, a lenticular lens and an image. Referring to FIG. 4 a design layer, designated 40 includes an image 42 and a lenticular lens 44. Lenticular means "pertaining to lenses" and "lenticules" are the plastic lenses that create the illusion of dimension or depth. Generally, the lens is a flat sheet of plastic that includes grooves and ridges that are lenticules which focus the sight on different parts of the underlying image. In this application, design layer 40 can include multiple pictures which are printed in alternating lines. A narrow band of each alternating picture is printed sequentially with narrow bands of each additional image. Generally, lenticular graphics can produce different categories of effects such as 3D or animation, morph, flip, motion, zoom, or combinations thereof.

The disclosed tiles can be used to form a variety of different images or pictures, or to form 3D images, etc. Images can be, for example, any desired picture, emblem, logo, pattern, etc. Thus, the present tiles are extremely effective for use as temporary floors by exhibitors, including trade shows, sports, motor car, promotional events and the like, where the company logo can be displayed.

Figure 5:
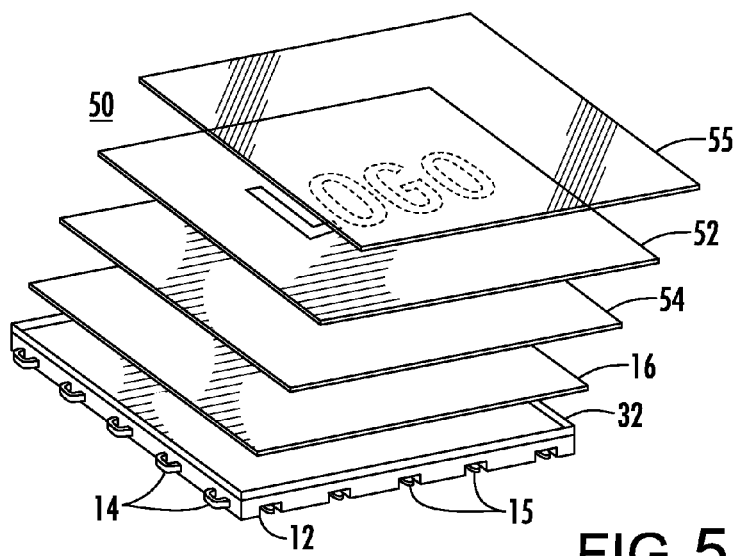
FIG. 5 is a top perspective view of another application of a floor tile in accordance with the present invention.

In another application (direct to support backing print) illustrated in FIG. 5, a floor tile 50 formed in accordance with the present invention is illustrated. In this application floor tile 50 includes base 12, generally as described above, with interlocking or tile connecting loops 14 and tabs 15 designed to interact with adjacent tiles to produce a completely cohesive floor. The walls of base 12 extend slightly above the upper surface to form upwardly extending side panels 32 that form the upper surface of base 12 into a tray. The underside of base 12 may include some or all of the cross hatched pattern of ribs 29 and four star pattern rib structures 30 as required for the specific use. Also in this application, vinyl layer 16 may, optionally, be included on the upper surface of base 12 if additional flexure is desired.

In this specific application, a floor graphic display 52 is applied directly to a layer 54 of support backing material. Display 52 can be painted or printed with standard paints or print ink with a thickness in the range of approximately 1 mm to 13 mm. Layer 54 is preferably a light weight rigid and durable material such as that used primarily in the manufacture of signs and displays. Layer 54 is a composite structure which makes it very light and highly resistant to moisture and some chemicals. The composite structure is an open or closed cell structure with thermoplastic properties displaying superior dent and scratch resistance. Layer 54 may include materials such as, plastic or foam core backer, vinyl or foam core or polystyrene support structure, thick paper and chipboard, mounting boards, smooth and/or clay coated surfaces, paper micro-fluted mounting board, all of various sizes and thickness. The print material 52 and support backing 54 provides added rigidity for print/graphics.

A protective layer 55 includes a scuff resistant clear sheet of protective material with a thickness in a range of 0.10 mm to 1.5 mm. Layer 55 is resistant to dirt and environmental elements, heavy foot traffic, and is skid resistant underfoot. Layer 55 is provided to protect floor graphic display 52. In addition, an optional urethane coating, generally used as a floor sealing material with aluminum oxide additive, can be applied to layer 55 to make it even more durable, scuff and water-resistant and to require minimal maintenance. Generally, surface finishes are a blend of synthetic resins most often referred to as urethanes or polyurethanes that remain on protective layer 55 of tile 50 and act as an additional form of protective coating. For purposes of this disclosure, floor graphic display 52 and support backing layer 54 in combination are considered "graphic media".

Figure 6:
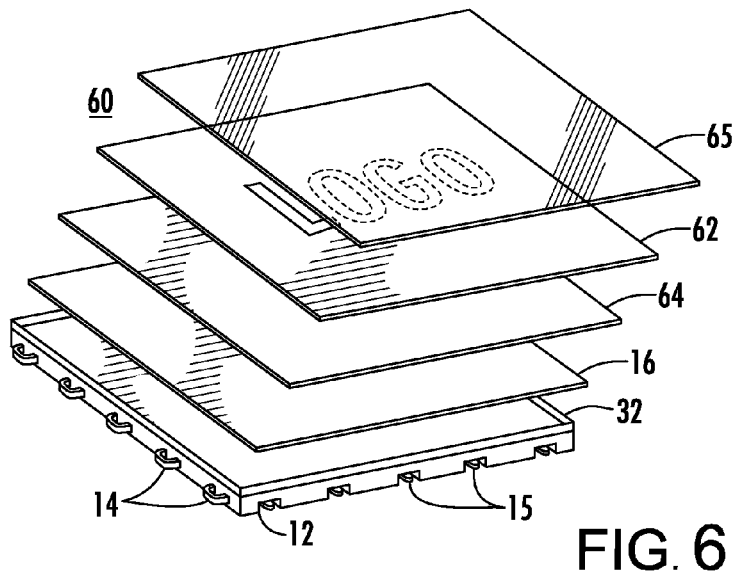
FIG. 6 is a top perspective view of another application of a floor tile in accordance with the present invention.

In another application (film print) illustrated in FIG. 6, a floor tile 60 formed in accordance with the present invention is illustrated. In this application floor tile 60 includes base 12, generally as described above, with interlocking or tile connecting loops 14 and tabs 15 designed to interact with adjacent tiles to produce a completely cohesive floor. The walls of base 12 extend slightly above the upper surface to form upwardly extending side panels 32 that form the upper surface of base 12 into a tray. The underside of base 12 may include some or all of the cross hatched pattern of ribs 29 and four star pattern rib structures 30 as required for the specific use. Also in this application, vinyl layer 16 may, optionally, be included on the upper surface of base 12 if additional flexure is desired.

In this specific application a display includes a print media or film 62. Print media or film 62 is preferably a self-adhesive film and can be, for example, PVC film with an adhesive layer top or bottom or it can be some other commercially available film.

A support backing or mounting material layer 64 is included to help support and protect the selected display. Support backing layer 64 consists of am open or closed cell structure approximately 1 mm to approximately 13 mm thick. Layer 64 is preferably a light weight rigid and durable material such as that used primarily in the manufacture of signs and displays. Layer 64 is a composite structure which makes it very light and highly resistant to moisture and some chemicals. The composite structure is an open or closed cell structure with thermoplastic properties displaying superior dent and scratch resistance. Layer 64 may include materials such as, plastic or foam core backer, vinyl or foam core or polystyrene support structure, thick paper and chipboard, mounting boards, smooth and/or clay coated surfaces, paper micro-fluted mounting board, all of various sizes and thickness. The support backing layer 64 provides added rigidity for the graphics. For purposes of this disclosure, print media or film 62 and support backing layer 64 in combination are considered "graphic media".

A protective layer 65 includes a scuff resistant clear sheet of protective material with a thickness in a range of 0.10 mm to 1.5 mm. Layer 65 is resistant to dirt and environmental elements, heavy foot traffic, and is skid resistant underfoot. Layer 65 is provided to protect floor graphic display 62. In addition, an optional urethane coating, generally used as a floor sealing material with aluminum oxide additive, can be applied to layer 65 to make it even more durable, scuff and water-resistant and to require minimal maintenance. Generally, surface finishes are a blend of synthetic resins most often referred to as urethanes or polyurethanes that remain on protective layer 65 of tile 60 and act as an additional form of protective coating.

Figure 7:
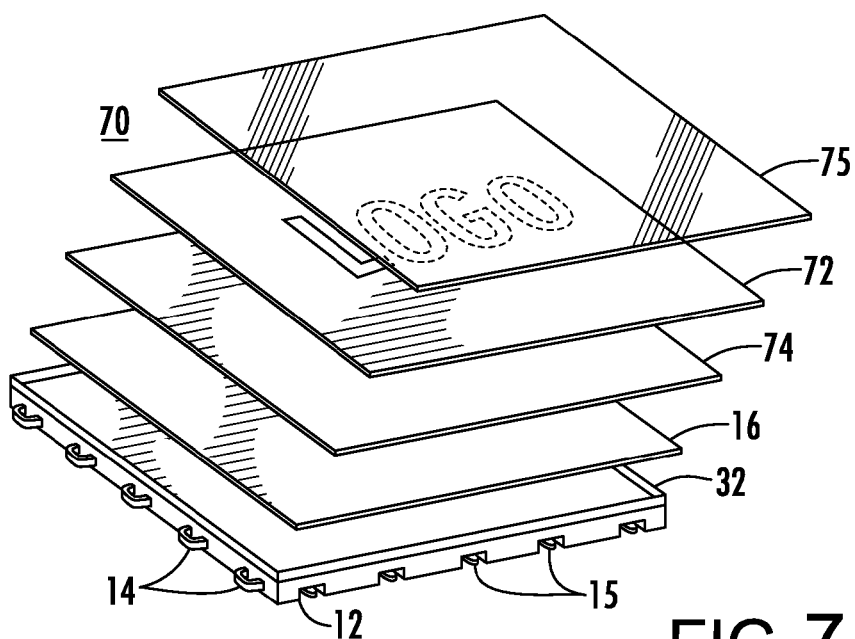
FIG. 7 is a top perspective view of another application of a floor tile in accordance with the present invention.

In another application (3D print direct to lens) illustrated in FIG. 7, a floor tile 70 formed in accordance with the present invention is illustrated. In this application floor tile 70 includes base 12, generally as described above, with interlocking or tile connecting loops 14 and tabs 15 designed to interact with adjacent tiles to produce a completely cohesive floor. The walls of base 12 extend slightly above the upper surface to form upwardly extending side panels 32 that form the upper surface of base 12 into a tray. The underside of base 12 may include some or all of the cross hatched pattern of ribs 29 and four star pattern rib structures 30 as required for the specific use. Also in this application, vinyl layer 16 may, optionally, be included on the upper surface of base 12 if additional flexure is desired.

In this specific application a graphic display is applied directly to the back of a lenticular lens with the combination designated 72 in FIG. 7. As illustrated more clearly in FIG. 4 and explained above, the lenticular lens is a clear sheet of an array of magnifying lenses, designed so that when viewed from slightly different angles, different images are magnified. The lenticular lens is made, for example, of acrylic or polystyrene and with a thickness in a range of approximately 8 mm to approximately 35 mm. The graphic display is a specially interlaced graphic reverse printed onto the back of the lenticular lens. When the interlaced graphic is viewed through the lenticular lens a 3D or animation effect, like 3D, morph, flip motion or zoom, is produced A protective backing 74 is included to provide added rigidity for graphics 72. Protective backing 74 can include, for example, a barrier ink or barrier film or a foam core applied to the back or ink side of graphics 72. Various options for protective backing 74 include white ink, barrier film, printable film paper or the like. For purposes of this disclosure, graphics 72 and protective backing layer 74 in combination are considered "graphic media".

A protective layer 75 includes a scuff resistant clear sheet of protective material with a thickness in a range of 0.10 mm to 1.5 mm. Layer 75 is resistant to dirt and environmental elements, heavy foot traffic, and is skid resistant underfoot. Layer 75 is provided to protect graphics 72. In addition, an optional urethane coating, generally used as a floor sealing material with aluminum oxide additive, can be applied to layer 75 to make it even more durable, scuff and water-resistant and to require minimal maintenance. Generally, surface finishes are a blend of synthetic resins most often referred to as urethanes or polyurethanes that remain on protective layer 75 of tile 70 and act as an additional form of protective coating.

Figure 8:
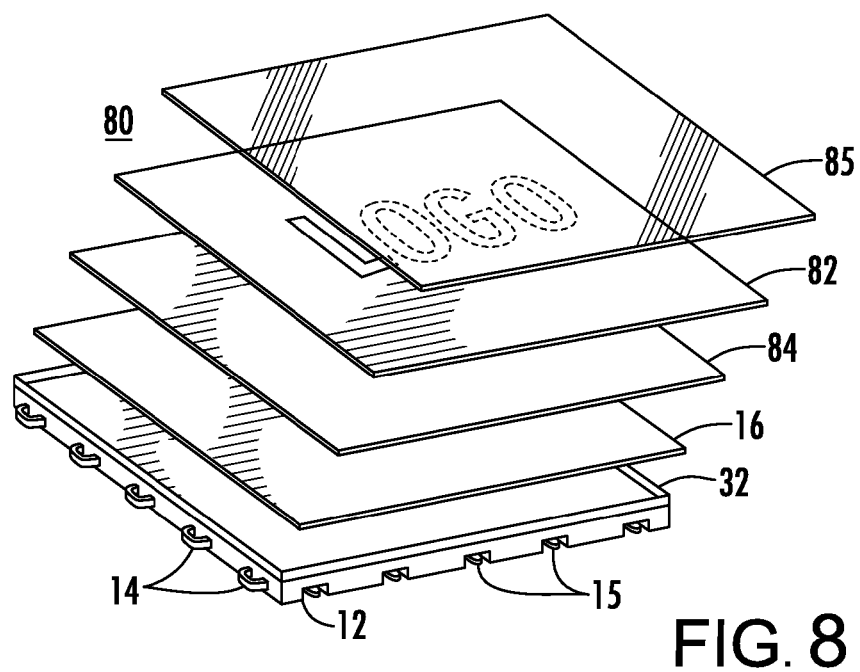
FIG. 8 is a top perspective view of another application of a floor tile in accordance with the present invention.

In another application (3D print to film media) illustrated in FIG. 8, a floor tile 80 formed in accordance with the present invention is illustrated. In this application floor tile 80 includes base 12, generally as described above, with interlocking or tile connecting loops 14 and tabs 15 designed to interact with adjacent tiles to produce a completely cohesive floor. The walls of base 12 extend slightly above the upper surface to form upwardly extending side panels 32 that form the upper surface of base 12 into a tray. The underside of base 12 may include some or all of the cross hatched pattern of ribs 29 and four star pattern rib structures 30 as required for the specific use. Also in this application, vinyl layer 16 may, optionally, be included on the upper surface of base 12 if additional flexure is desired.

In this specific application a graphic display 82 includes a combination lenticular lens, generally as described above, with print media. The lenticular lens is made, for example, of acrylic or polystyrene and with a thickness in a range of approximately 8 mm to approximately 35 mm. Print media or film is preferably a self-adhesive film and can be, for example, PVC film with an adhesive layer top or bottom or it can be some other commercially available film. For purposes of this disclosure, the lenticular lens and the print media or film in combination are considered "graphic media".

An optional support backing or mounting material layer 84 may be included to help support and protect the selected display. This may be used, for example, as additional support for thinner lenticular lenses. Support backing layer 84 consists of am open or closed cell structure approximately 1 mm to approximately 13 mm thick. Layer 84, if included, is preferably a light weight rigid and durable material such as that used primarily in the manufacture of signs and displays. Layer 84 can be, for example, a composite structure which makes it very light and highly resistant to moisture and some chemicals.

A protective layer 85 includes a scuff resistant clear sheet of protective material with a thickness in a range of 0.10 mm to 1.5 mm. Layer 85 is resistant to dirt and environmental elements, heavy foot traffic, and is skid resistant underfoot. Layer 85 is provided to protect graphics 82. In addition, an optional urethane coating, generally used as a floor sealing material with aluminum oxide additive, can be applied to layer 85 to make it even more durable, scuff and water-resistant and to require minimal maintenance. Generally, surface finishes are a blend of synthetic resins most often referred to as urethanes or polyurethanes that remain on protective layer 85 of tile 80 and act as an additional form of protective coating.

As mentioned briefly above, it should be understood that a graphic design, logo and the like, can be provided by different portions of the design carried by different tiles of multiple tiles. When properly laid, the multiple tiles, designated 90, cooperate to form an image, as shown for example in FIG. 9. In this specific example multiple tiles 90 include twelve tiles, each designated 92, arranged in a three tile wide by four tile high pattern. It will be understood however, that any number of tiles can be included and formed in any desired shape (e.g. rectangular, circular, triangular, irregular, etc.).

In order to make a large image or pattern fit into multiple different tiles the large image must be broken into multiple individual images. This specific print preparation requires a master design that illustrates a grid. The grid must allow for the gaps between the individual modular interlocking free floating tiles 92. Actual parts of the individual images must be cropped from the print process to make the original image stay in proportion and to scale. Without cropping out the gaps the image would expand in proportion to the size of the gap multiplied by the number of tiles used to form the final image. To accomplish this accounting for tile gaps in a single image with multiple tiles, the following preferred method is provided with the image of FIG. 9 used as an example.

In this specific example each tile 92 is a 12" by 12" tile. While creating an image that will span multiple tiles, the image must be oversized (image bleed) by a factor of 0.125" per square foot, to account for the gap (designated 94) between adjacent tiles 92. Additionally a variable bleed is added to all four sides. The overall image is decreased by 0.125" because the cut lines are equal to t (the number of tiles) minus 1, i.e. where there are four tiles only three gaps exist.

Using FIG. 9 as the example, the image is 36" by 48" with a 0.5" bleed per side and a gap 94 of 0.125", the formula would be:

$$X+(g(x/w))-g+2b$$

$$y+(g(y/h))-g+2b$$

where:
g equals the gap width in inches;
w equals the width of a single tile;
h equals the height of a single tile;
X equals the overall width, in inches;
y equals the overall height, in inches; and
b equals the bleed per side.

Thus, a 36" by 48" image, using 12" by 12" tiles with a gap between adjacent tiles of 0.125", requires a working image of 37.25" by 49.375".

As a further illustration and assuming, for example that the gap (94) between adjacent modular tiles (92) is ⅛ inch, a tile image that spanned 100 tiles without cropping the image would expand ⅛ times 99 (number of gaps between 100 tiles) or 12.375 inches. This expansion would completely distort the image. Thus, the image must be cropped the exact same size as the gap to achieve a level of visual consistency. To help maintain the desired consistency the described process must be employed. It will be understood that the gap size for which allowance must be made can generally range from approximately 1/16 of an inch to 15/16 of an inch, depending on tile size and expansion ratio. It will also be understood that the tiles can be substantially any selected shape, such as square, rectangular hexagonal, octagonal, and the like.

Thus a tile including a base 12 which is configured to receive any of the laminate structures described is disclosed. Also, the tile can be easily incorporated into images requiring multiple tiles to portray. Further, any images from 3D to simple floor patterns (e.g. wood, etc.) can be easily incorporated. It will be understood that use of the novel laminated tile is a substantial improvement in the cost of the initial construction of a sports type floor. Also, a floor constructed of the novel laminated tiles has vast improvements in the ability to design and color the floor, if desired, as well as simple and inexpensive replacement capabilities. Further, the novel laminated tiles provide benefits in sound reduction, flexibility to reduce athletic injuries, and yet do not reduce the wear ability of standard tiles.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method of forming a multiple floor tile image comprising the step of:
   providing a plurality of floor tiles, each tile including a base having an underside, an upper surface, and perimetric edges, the base being formed of a high impact copolymer material designed to provide a slight flexure, the base including interlocking or tile connecting loops and tabs designed to interact with adjacent floor tiles to hold the adjacent tiles fixedly in place, the base further including panels extending upwardly from the perimetric edges thereof and forming the upper surface into a tray;

providing a working image of the multiple floor tile image including oversizing the image according to the equation:

$$X+(g(x/w))-g+2b$$

$$y+(g(y/h))-g+2b$$

where:
- g equals a gap width between adjacent tiles in inches;
- w equals the width of a single tile;
- h equals the height of a single tile;
- X equals the image overall width, in inches;
- y equals the image overall height, in inches; and
- b equals a bleed per side;

separating the working image into multiple individual images corresponding to the multiple floor tiles and cropping parts of the individual images to maintain the working image in proportion and to scale;

using the cropped individual images, forming a specific graphic media for each specific tile of the multiple tiles, and positioning the specific graphic media in the tray of the specific tile;

covering the graphic media of each tile of the plurality of tiles with a protective coating overlying the graphic media; and positioning the multiple tiles on a support surface and interlocking the multiple tiles by connecting the loops and tabs of adjacent tiles, the positioning including arranging the multiple tiles to form the multiple floor tile image.

2. A method as claimed in claim 1 wherein the step of forming a specific graphic media includes applying a floor graphic display directly to a support backing layer.

3. A method as claimed in claim 1 wherein the step of forming a specific graphic media includes mounting a film on a support backing layer.

4. A method as claimed in claim 1 wherein the step of forming a specific graphic media includes providing a lenticular lens and applying an image directly to a rear surface of the lenticular lens.

5. A method as claimed in claim 4 wherein the step of forming a specific graphic media includes applying a 3D image directly to a rear surface of the lenticular lens.

6. A method as claimed in claim 5 wherein the step of applying a 3D image includes applying a self-adhesive film including the 3D image directly to the rear surface.

\* \* \* \* \*